(12) United States Patent
Sarlay et al.

(10) Patent No.: US 7,085,728 B2
(45) Date of Patent: Aug. 1, 2006

(54) METHOD FOR FORECASTING AND MANAGING MULTIMEDIA CONTRACTS

(75) Inventors: John David Sarlay, Dallas, TX (US); Paul Harold Leamon, McKinney, TX (US); Meghan Herbert, Dallas, TX (US)

(73) Assignee: IEX Corporation, Richardson, TX (US)

( * ) Notice: Subject to any disclaimer, the term of this patent is extended or adjusted under 35 U.S.C. 154(b) by 0 days.

(21) Appl. No.: 09/919,302

(22) Filed: Jul. 31, 2001

(65) Prior Publication Data

US 2003/0061088 A1 Mar. 27, 2003

(51) Int. Cl.
*G06F 17/60* (2006.01)

(52) U.S. Cl. .............................. 705/9; 705/8; 379/88.13
(58) Field of Classification Search ................ 705/9, 705/8
See application file for complete search history.

(56) References Cited

U.S. PATENT DOCUMENTS

| | | | | |
|---|---|---|---|---|
| 5,185,780 A | * | 2/1993 | Leggett | 379/265.08 |
| 5,325,292 A | * | 6/1994 | Crockett | 705/9 |
| 5,615,121 A | * | 3/1997 | Babayev et al. | 705/9 |
| 5,787,000 A | * | 7/1998 | Lilly et al. | 700/95 |
| 5,911,134 A | * | 6/1999 | Castonguay et al. | 705/9 |
| 6,044,355 A | * | 3/2000 | Crockett et al. | 705/8 |
| 6,070,142 A | * | 5/2000 | McDonough et al. | 705/7 |
| 6,115,693 A | * | 9/2000 | McDonough et al. | 705/10 |
| 6,128,646 A | * | 10/2000 | Miloslavsky | 709/206 |
| 6,466,664 B1 | * | 10/2002 | Zhao | 379/266.08 |
| 6,952,732 B1 | | 10/2005 | Nourbakhsh et al. | |

FOREIGN PATENT DOCUMENTS

EP 01079039 * 9/1999

OTHER PUBLICATIONS

"Blue Pumpkin Software Announces Prime Time 2.0, Imdustry's First Shrink-Wrapped Solution for Managing Multi-Skilled Customer Contact Center". Jul. 6, 1999. Downloaded from www.bluepumpkin.com Press Releases.*
"Blue Pumpkin Software Earns Best Call Center Solution Award at Voice Europe". Nov. 5, 1999. Downloaded from www.bluepumpkin.com Press Releases.*
"Blue Pumpkin Software and Siemens Announce Partnership for Largest Call Centre Market in Continental Europe". Feb. 24, 2000. Downloaded from www.bluepumpkin.com Press Releases.*
"TravelSmith Selects Blue Pumpkin to Update Call Center Operations Schedules Created 80% Faster with PrimeTime Workforce Management Solution". Mar. 6, 2000. Downloaded from www.bluepumpkin.com Press Releases.*

(Continued)

*Primary Examiner*—Tariq R. Hafiz
*Assistant Examiner*—Johnna Loftis
(74) *Attorney, Agent, or Firm*—David H. Judson

(57) ABSTRACT

Multimedia contacts are forecasted, propagated, and managed for each period in a range. The number of contacts received in a period are forecasted using historical methods and are propagated to succeeding periods based on the business goals, such as how quickly a certain contact type is to be handled. After the contacts have been propagated, the total contacts to handle is determined for each period and the staffing requirements are calculated therefrom.

10 Claims, 4 Drawing Sheets

OTHER PUBLICATIONS

"Blue Pumpkin and Taske Partner to Deliver Powerful Call Center Forecasting, Scheduling and Management Solutions". Mar. 21, 2000. Downloaded from Dialog.*

"Nortel Networks, Blue Pumpkin to Offer Advanced Solutions for Second Wave of e-Business". Apr. 11, 2000. Downloaded from www.bluepumpkin.com Press Releases.*

"Witness Systems Partners with Blue Pumpkin Software to off Contact Cneter Solutions for Scheduling, Recording, and Performance Analysis". Apr. 28, 200. Downloaded from www.bluepumpkin.com Press Releases.*

"Siemens Adds e-Servce and Multi-Media Options to CRM Solution". Cambridge Telecom Report. Jan. 31, 2000. Downloaded from Dialog.*

McClave, James, and P. George Benson. A First Course in Business Statistics. Second Edition. Dellen Publishing Company. 1983.*

Reynolds, Penny. "The Science of Call Canter Management". Communication News. Oct. 1998. vol. 35. ISS. 10. p. 64. Downloaded from Proquest.*

Hollman, Lee. "Keeping on Schedule with Workforce Management Software." Call Center Magazine. Apr. 2001. vol. 14. Iss. 4. p. 70. Downloaded from Proquest.*

"Mustang.com and Pipkins Join Forces in eService Workforce Management", Business Editors, Business Wire, New York: Dec. 23, 1999. from Proquest*

"Pipkins Teams with Mustang.com To Enable Call Center Agents to Integrate Phone Call and E-mail Functions", Business Editors, Business Wire: New York: Mar. 16, 2000. from Proquest.*

"Workforce Management Software Roundup", from www.tmcnet.com, customer interaction solutions, Apr. 2001.*

Hollman, Lee. "Keeping On Schedule with Workforce Management Software", Call Center MAgazine, San Francisco, Apr. 2001, from Proquest.*

Maxima Advantage, from www.tmcnet.com, 2000 Call Center CRM Solutions Editors Choice, Jan. 2000. wwww.tmcnet.com/articles/ccsmag/0100/0100labs1.htm.*

* cited by examiner

METHOD FOR FORECASTING AND MANAGING MULTIMEDIA CONTRACTS

TECHNICAL FIELD

The invention relates generally to telecommunications and, more particularly, to computerized methods and systems for forecasting and planning workload in a multimedia contact center.

BACKGROUND

A call center is an organization of people, telecommunications equipment and management software, with the mission of efficiently handling telephone-based customer contacts. A typical call center must balance competing goals. Customers should experience high quality and consistent service as measured, for example, by how long the customer's call must wait in queue before being answered, generally measured in terms of seconds or minutes. At the same time, this service should be provided at the lowest possible cost to the call center owner.

Workforce management systems provide important tools for meeting the goals of the call center. These systems generate forecasts of call received volumes and call handling times based on historical data to determine how much staff will be needed at different times of the day and week. The systems then create schedules that match the staffing to the anticipated needs.

As methods of communications expand, however, call centers are also expected to handle various forms of multimedia contacts, such as emails, faxes, web chat, and the like. Typically, these other types of multimedia contacts allow a slower response time than calls, such as minutes, hours, days, and the like. A call center expected to handle voice calls and multimedia contacts is generally referred to as a contact center.

Forecasting when to handle the new types of multimedia contacts in the same manner as calls is not efficient. First, handling the contact immediately after it is received is not necessary for certain media. For instance, if an email arrives at midnight, it may not be necessary to have the staff available to respond immediately when a response to the email can wait until the next business day, or some other time set by the competing business goals. Second, since the contacts do not have to be handled immediately, using the forecasted number of contacts received as the basis to plan staffing levels likely results in overstaffing, and hence inefficiencies, for a large portion of the time.

Therefore, there is a need to provide a method and a system for forecasting and planning staffing levels in contact center environments.

SUMMARY

The present invention provides a method and a system that forecasts and plans staffing levels in a multimedia contact center environment. The method and system comprises obtaining a forecast of contacts received within each of one or more periods, propagating the contacts received over one or more succeeding periods according to the business goals for each contact type, and calculating the workload, or staffing levels, required to handle the contacts propagated to each of the one or more succeeding periods.

BRIEF DESCRIPTION OF THE DRAWINGS

For a more complete understanding of the present invention, and the advantages thereof, reference is now made to the following descriptions taken in conjunction with the accompanying drawings, in which.

DETAILED DESCRIPTION

In the following discussion, numerous specific details are set forth to provide a thorough understanding of the present invention. However, it will be obvious to those skilled in the art that the present invention may be practiced without such specific details. In other instances, well-known elements have been illustrated in schematic or block diagram form in order not to obscure the present invention in unnecessary detail. Additionally, for the most part, details concerning automatic call distributors, multimedia servers, and the like have been omitted inasmuch as such details are not considered necessary to obtain a complete understanding of the present invention, and are considered to be within the skills of persons of ordinary skill in the relevant art.

It is further noted that, unless indicated otherwise, all functions described herein are performed by a processor such as a computer or electronic data processor in accordance with code such as computer program code, software, or integrated circuits that are coded to perform such functions.

It is still further noted that, while the description of the invention is made in reference to a single contact center, the methods and systems described herein may also be incorporated for and/or across multiple contact centers.

The principles of the present invention and their advantages are best understood by referring to the illustrated embodiment depicted in FIGS. 1–3B.

Figure 1:
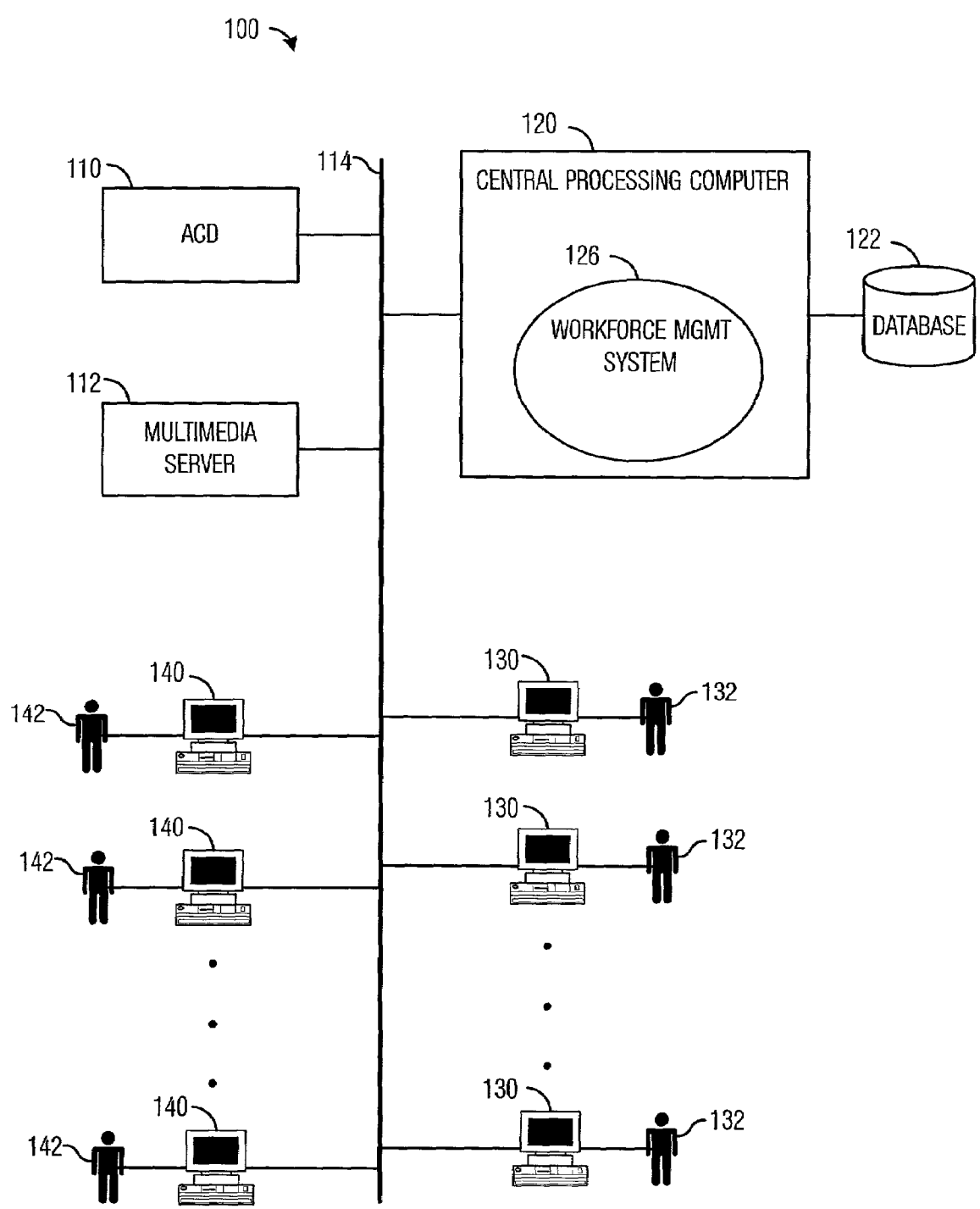
FIG. 1 schematically depicts a network environment that embodies features of the present invention.

Referring to FIG. 1 of the drawings, the reference numeral 100 generally designates one environment that embodies features of the present invention. The environment 100 is exemplified herein as a contact center environment, though it is understood that other types of environments may constitute the environment 100 as well, and that the environment 100 is not limited to being a contact center environment and may, for example, include environments such as sales force environments, field service environments, manufacturing environments and other types of environments in which tasks must be finished within a certain amount of time. The environment 100 generally comprises an automatic call distributor (ACD) 110 and a multimedia server 112 coupled to a central processing computer 120 via a network 114, such as a wireline and/or wireless local area network (LAN), a wireline and/or wireless wide area network (WAN), the Internet, an Intranet, or the like. The ACD 110 and multimedia server 112 generally provide routing capabilities for incoming voice calls (via the ACD) and other contacts (via the multimedia server), such as faxes, e-mail, voice mail, web requests, web call-back requests, web chats, web voice calls, web video calls, and the like. The function and operation of the ACD 110 and multimedia server 112 are considered to be well known to a person having ordinary skill in the art and, therefore, will not be discussed in further detail herein, except to the extent necessary to disclose the present invention.

The central processing computer 120 receives from the ACD 110 and the multimedia server 112 periodic contact information, such as the number of contacts received and handled for each contact type ("CT") (i.e., a CT is the type of contact, such as voice call, email, fax, voice mail, web requests, web call-back requests, web chats, web voice calls, web video calls, and the like), the average handling time ("AHT") of each CT, and the like, and is preferably stored in database 122. While the database 122 is shown external to the computer, one skilled in the art will appreciate that the database 122 may be included within the central processing computer 120, or that the data may be retrieved when needed instead of storing the data in the database 122. These variations, and others, are considered to be well known to one skilled in the art upon a reading of the present disclosure.

The central processing computer 120 is also coupled via the network 114 to one or more agent workstations 130 and to one or more supervisor workstations 140, which provide an interface between the network 114 and one or more agents 132 and supervisors 142, respectively. The agent workstations 130 and the supervisor workstations 140 are preferably con figured to access the central processing computer 120 via the network 114.

Agents 132 access, via telephones (not shown) and agent workstations 130, the ACD 110, multimedia server 112, or other contact servers (not shown) to aid in contact resolution. As the agents 132 service the contacts, the ACD 110 and the multimedia server 112 collect data pertaining to the contacts received and contacts handled and periodically transmit the data to the central processing computer 120, which preferably stores the information in the database 122.

In one embodiment of the present invention, the central processing computer 120 comprises a workforce management system (WMS) 126, such as the TotalView™ Workforce Management system available from IEX Corporation. The WMS 126 integrates many management functions, such as workforce forecasting and scheduling, skill planning and scheduling, multimedia contact management, real-time schedule adherence, and the like, and provides an interface to the database 122. Additionally, the WMS 126 generates forecasts of call volumes and call handling times based on historical data, and determines how much staff will be needed at different times of the day and week. Furthermore, these systems have the capability of creating schedules that match the staffing to the anticipated needs. A representative system is described in U.S. Pat. No. 5,325,292, which patent is assigned to the assignee of this application and is incorporated herein by reference for all purposes. It is preferred that the present invention be incorporated into the functionality of such a WMS 126 to provide multimedia contact forecasting, planning, and scheduling capabilities. Alternatively, however, a method and/or an apparatus implementing features of the present invention may be designed as a stand-alone component or feature.

Figure 2:
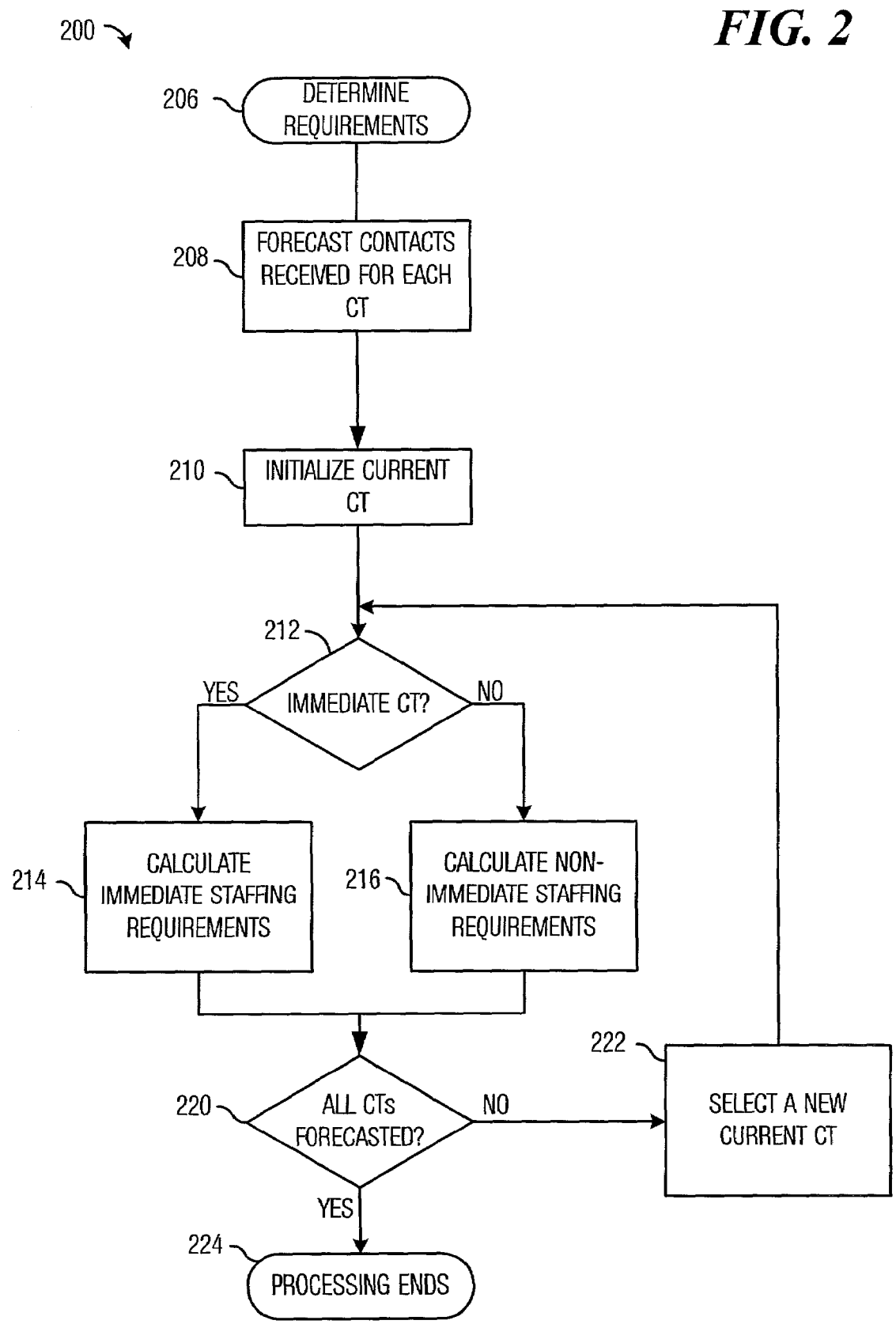
FIG. 2 illustrates one embodiment of the present invention in which staffing requirements are calculated.

FIG. 2 is a flow chart depicting steps that may be performed in the contact center environment 100 in accordance with one embodiment of the present invention to forecast contact center staffing requirements. Accordingly, in step 206 a request is received to determine the staffing requirements for a contact center. In step 208, the number of contacts received for each CT is forecasted for each time period ("period"), such as every half-hour, hour, or the like. Generally, the number of contacts received in each period is forecasted by analyzing historical data and setting the forecasted values to comparable values experienced during comparable time periods. Optionally, the user, such as the supervisor 142, may be given the ability to modify the forecasted contacts received for one or more CTs. The modified values from this optional case are used as the contacts received value in the discussion that follows.

In step 210, a CT is selected as a "current" CT for purposes of performing the loop in steps 212–222. In step 212, a determination is made whether the "current" CT is an immediate CT or a non-immediate CT. Immediate CTs, such as voice calls, web chat, and the like, are contacts that generally require immediate attention, preferably within seconds, minutes, or within a reasonable amount of time given the type of contact and other business considerations, otherwise, the person initiating the contact is likely to discontinue the contact by hanging-up or disconnecting. Non-immediate CTs, such as faxes, emails, letters, and the like, are generally allocated a longer response time, such as hours, days, weeks, and the like, and are generally characterized as not requiring an interactive dialog in real-time.

If, in step 212, it is determined that the "current" CT is an immediate CT, then execution proceeds to step 214, wherein the staffing requirements are determined for the "current" CT. Preferably, the staffing requirements for immediate CTs are calculated such that the staffing requirements are sufficient to resolve the contacts within a predetermined amount of time, such as by using Erlang-C traffic tables, algorithms and/or simulations. The use of Erlang-C traffic tables and simulations are described in in U.S. Pat. Nos. 5,185,780 and 6,044,355, entitled "Method for Predicting Agent Requirements in a Force Management System" and "Skills-Based Scheduling for Telephone Call Centers", respectively. Erlang-C traffic tables, algorithms, and/or simulations are well known to a person of ordinary skill in the art and will not be discussed in greater detail.

If, in step 212, a determination is made that the "current" CT is not an immediate CT, i.e., it is a non-immediate CT, then execution proceeds to step 216, wherein the staffing requirements for non-immediate CTs are calculated. The preferred method of calculating the staffing requirements for non-immediate CTs is based on the expected workload requirements and will be discussed in further detail below with reference to FIGS. 3A and 3B.

Upon completion of calculating the staffing requirements for the "current" CT in step 214 or 216, execution proceeds to step 220, wherein a determination is made whether the staffing requirement for all CTs have been calculated. If a determination is made that the staffing requirement for all CTs have not been made, then execution proceeds to step 222, wherein a new "current" CT is selected. Thereafter, the process described above with reference to steps 212–222 are repeated.

If, in step 220, it was determined that all CTs have been processed, then execution proceeds to step 224, wherein the forecasting processing terminates.

Figure 3A:
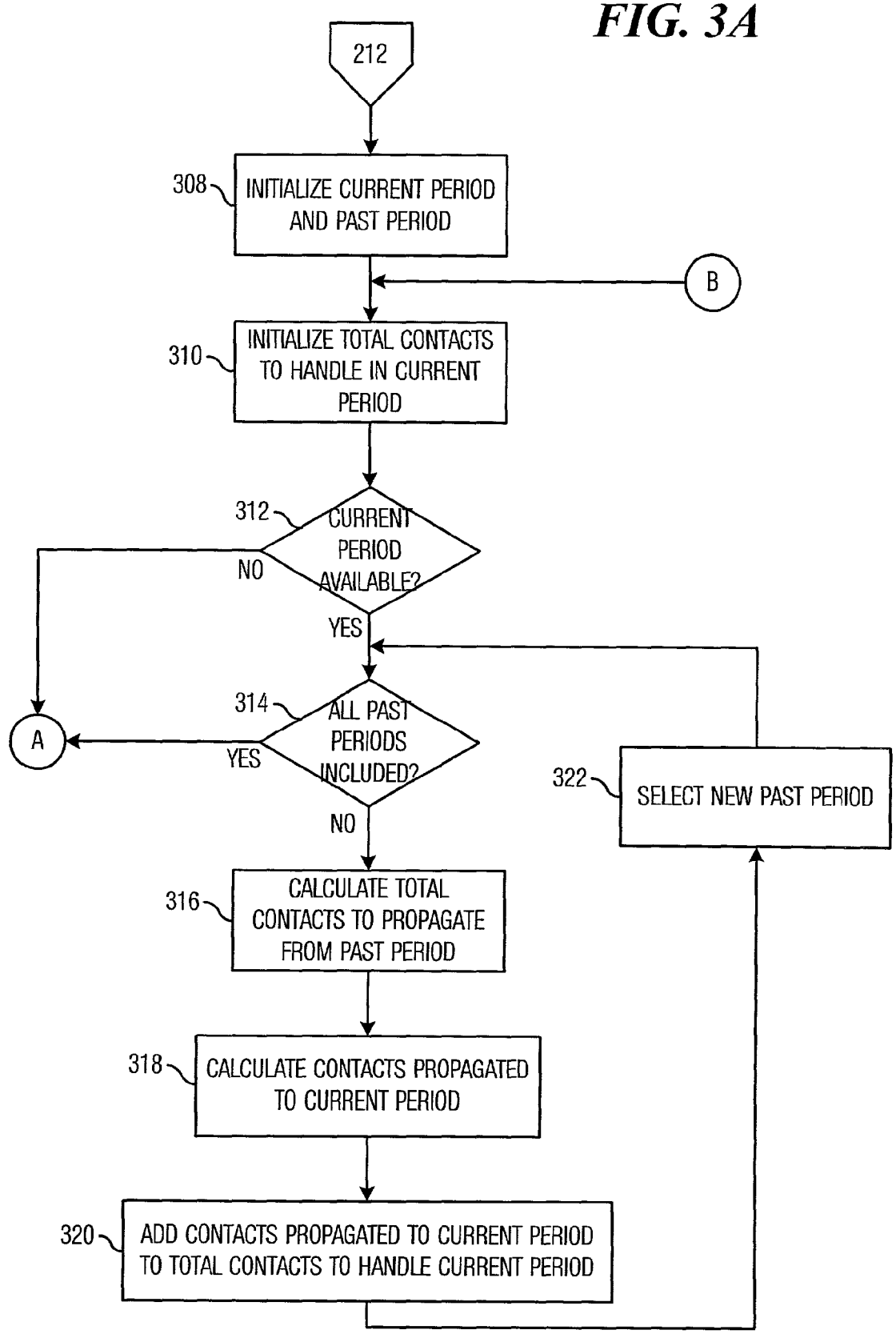
FIGS. 3A–3B illustrate one embodiment in which the staffing requirements for non-immediate contacts are calculated.
Figure 3B:
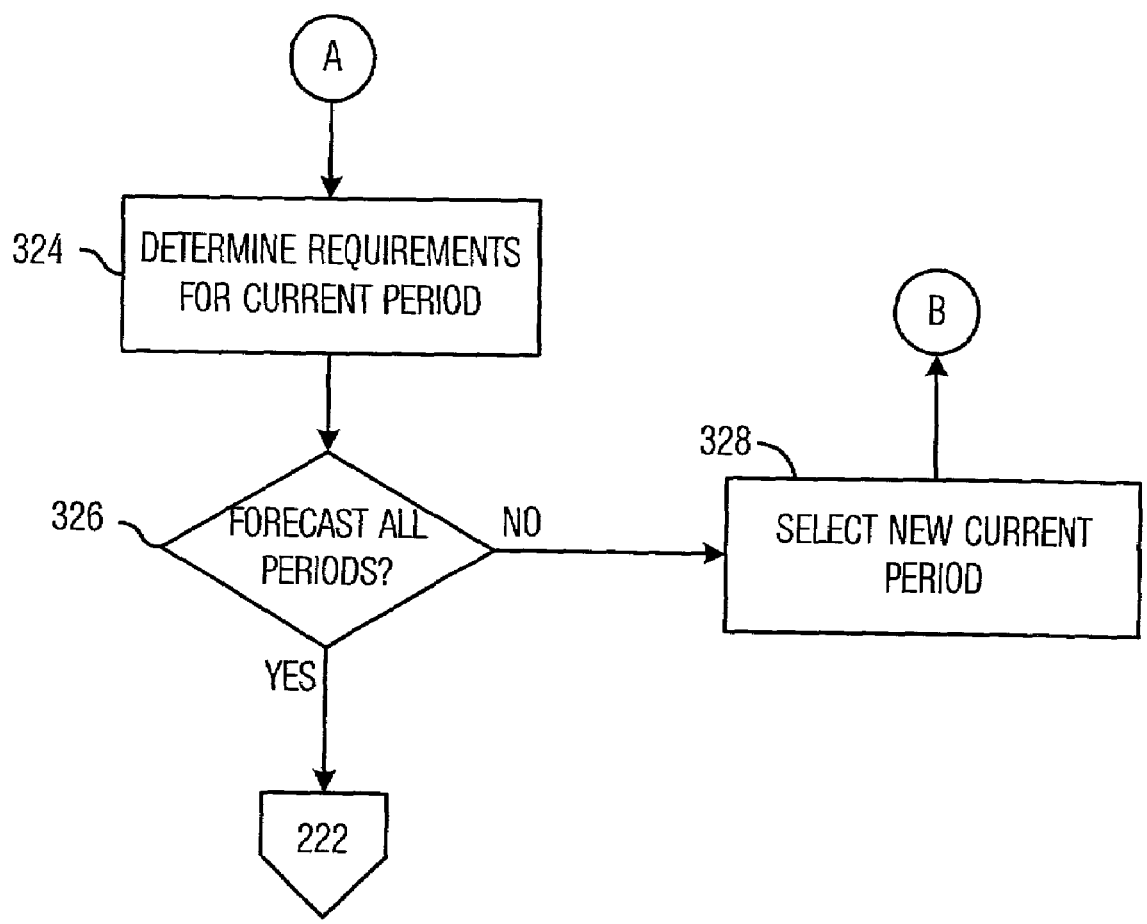

FIGS. 3A and 3B illustrate a method for calculating the staffing requirements for non-immediate CTs, discussed above with respect to step 216 (FIG. 2), in accordance with a preferred embodiment of the present invention. Accordingly, if a determination is made in step 212 (FIG. 2) that the CT is a non-immediate CT, execution proceeds to step 216 (FIG. 2), the details of which are depicted by steps 308–328 of FIGS. 3A and 3B. Generally, as will be discussed in greater detail below, the staffing requirements for the non-immediate CTs are determined by propagating contacts received from past periods to the current period based upon service goals and propagation factors.

The operation of the present invention will be described below by way of an example scenario, though it is understood that the present invention is not to be construed as limited to the following example. Accordingly, Table 1 comprises a chart illustrating how non-immediate contacts received for a non-immediate CT are propagated to the receiving and/or succeeding periods based upon the relative propagation factors for each period. Illustrated are eight periods, P1–P8, and the contacts received for a non-immediate CT, indicated by the bold number 10 under the P1 column, 20 under the P2 column, 30 under the P3 column, 40 under the P4 column, and 50 under the P5 column. Assume the service goal (i.e., the percentage of contacts received in a given period that is desired to have handled within a specified number of succeeding periods) for contacts received in a period is to handle 100% by the end of the fifth succeeding period. Also shown are the propagation factors for each period P1–P8. The propagation factors are a relative indication of the number of contacts that may be handled within a period, and are based in whole or in part on the number of agents available, agent availability (the amount of time that an agent or group of agents may allocate to service contacts), excess capacity (the amount of time that an agent or group of agents has to handle additional work), minimum and maximum backlog goals, agent productivity (the average handling time for a CT), agent schedule adherence, and the like.

For example, as will be explained in greater detail below, the 10 contacts received in period P1 are propagated as shown over periods P1–P6, the 20 contacts received in period P2 are propagated as shown over periods P2–P7, the 30 contacts received in period P3 are propagated as shown over periods P3–P8, the 40 contacts received in period P4 are propagated as shown over periods P4–P9, and the 50 contacts received in period P5 are propagated as shown over periods P5–P10, rounded to the nearest tenth. Preferably, the propagation of the CTs are performed utilizing floating point values. Alternatively, however, integer values, or floating point values with greater precision, may be used. Also shown are the propagation factors for each period P1–P8.

It should be noted, however, that while the propagation method and apparatus may propagate contacts received in one period over multiple succeeding periods, and may overlap multiple periods with contacts received in a succeeding period, it is preferred that contacts of a particular contact type are handled in the order received. For example, the 10 contacts received in period P1 in the table above are preferably handled before handling any contacts received in a succeeding period, such as periods P2 and P3. The propagation is a method of distributing the workload in accordance with a predefined distribution scheme, and does not necessary indicate the order contacts may be processed. It may be preferred, however, to handle some contact types, such as e-mails, before other contact types, such as facsimiles.

Referring now to FIG. 3A, in step 308 the "current" period and the "past" period is selected. It may be helpful to note that FIG. 2 contains a loop that steps through all CTs. For each CT, FIG. 3 contains an outer loop, steps 308–328, for stepping through all periods being forecasted, i.e., the "current" period, and an inner loop, steps 314–322, for stepping through all "past" periods affecting the "current" period.

In step 310, the "total contacts to handle in the current period" is initialized to zero. The "total contacts to handle in the current period" represents the number of contacts of the "current" CT (from FIG. 2) received in "past" periods and in the "current" period that need to be handled in the "current" period.

In step 312, a determination is made whether the "current" period is available for handling contacts of the "current" CT. The "current" period may be unavailable for the "current" CT due to the contact center being closed or inactive for the "current" period, no agents available that possess the required skills necessary to handle contacts of the "current" CT during the "current" period, a propagation factor for the "current" period having a value of zero, or the like. If a determination is made that the "current" period is available, then execution proceeds to steps 314–322, otherwise, execution proceeds to step 324 discussed below.

Steps 314–322 represent a loop in which the non-immediate contacts from "past" periods, such as the five previous periods in the example above, are propagated to the "current" period. In the example discussed above, if the "current" period is the period P6 and the service goal is to handle all non-immediate CT contacts received in the succeeding five periods, then the periods affecting the period P6 are the periods P1–P6. The loop represent by steps 314–322 is to be executed once for each of the first, second, third, fourth, fifth, and sixth periods for the "current" CT.

TABLE 1

|  | P1 | P2 | P3 | P4 | P5 | P6 | P7 | P8 | P9 | P10 |
|---|---|---|---|---|---|---|---|---|---|---|
| Contacts Received/ Propagated | 10 | | | | | | | | | |
| | 0.5 | 1 | 1.5 | 2 | 2.5 | 2.5 | | | | |
| | | 20 | | | | | | | | |
| | | | 1.7 | 2.5 | 3.3 | 4.2 | 4.2 | 4.2 | | |
| | | | 30 | | | | | | | |
| | | | | 3.3 | 4.4 | 5.6 | 5.6 | 5.6 | 5.6 | |
| | | | | | 40 | | | | | |
| | | | | | 5.7 | 7.1 | 7.1 | 7.1 | 7.1 | 5.7 |
| | | | | | 50 | | | | | |
| | | | | | | 8.9 | 8.9 | 8.9 | 8.9 | 7.1 | 7.1 |
| Total Propagated | 0.5 | 2.7 | 7.3 | 15.4 | 28.3 | 28.3 | 25.8 | 21.6 | 12.8 | 7.1 |
| Propagation Factors for Each Period | | | | | | | | | | |
| | 1 | 2 | 3 | 4 | 5 | 5 | 5 | 5 | 4 | 4 |

Accordingly, in step 314, a determination is made whether all past periods affecting the "current" period have been analyzed. If a determination is made that all past periods affecting the "current" period have not been analyzed, then the execution proceeds to steps 316–322 for the selected "past" period that has yet to be analyzed, otherwise, execution proceeds to step 324 discussed below. In step 316, the "total contacts to propagate from the past period" is calculated. Preferably, the "total contacts to propagate from the past period" is calculated as the product of the "contacts received" (as derived from step 208, FIG. 2) and the service percent for the "past" period as applied to the "current" period. In the example above, if the "current" period is P6, the "total contacts to propagate from the past period" of P1 is 10 (10 contacts received in P1 multiplied by a service goal of 100% of contacts received handled by the end of the fifth succeeding period), of P2 is 20 (20 contacts received in P2 multiplied by a service goal of 100% of contacts received handled by the end of the fifth succeeding periods), and so on for contacts received in periods P3–P6.

While the present examples and the discussion are provided in reference to a single service goal and continuous succeeding periods, multiple service goals, such as a service goal of handling 35% of contacts received within 3 periods, 70% of contacts within 5 periods, and 100% of the contacts received within 8 periods; non-continuous periods, such as servicing contacts only in the first, fifth, and seventh succeeding periods; and/or an average speed of answer may also be implemented.

Next, in step 318, the "contacts propagated to the current period" is calculated. Preferably, the "contacts propagated to the current period" is calculated as the product of "total contacts to propagate from the past period" and the quotient of the propagation factor of the "current" period divided by the sum of propagation factors of all periods affected by the "past" period.

The sum of propagation factors of all periods affected by the "past" period is calculated by summing the propagation factors for each period over which contacts received in the "past" period are propagated. In reference to the example above, if the "current" period is period P6 and the "past" period is P3, then the propagation factor of the "current" period is 5 and the sum of the propagation values of all periods affected by the "past" period is 27 (3 for P3+4 for P4+5 for P5+5 for P6+5 for P7+5 for P8) for a quotient of 0.185. Therefore, of the 30 contacts received in period P3, 5.6 are forecasted to be handled in period P6.

Alternatively, the contacts received may be propagated in accordance with a predefined curve, such as a front-weighted curve, a back-weighted curve, a bell curve, and/or a flat curve.

In step 320, the "total contacts to handle in the current period" is calculated. The "total contacts to handle in the current period" is calculated as the running sum of the "total contacts to propagate from the past period" for all "past" periods affecting the "current" period. In reference to the example above, if the "current" period is period P6, then the "total contacts to handle in the current period" is equal to 2.5 from P1, 4.2 from P2, 5.6 from P3, 7.1 from P4 and 8.9 from P5 for a sum of 28.3.

After, in step 320, the "total contacts to propagate from the current period" is updated with data from the "past" period, execution proceeds to step 322, wherein a new "past" period is selected. Thereafter, execution proceeds to steps 314–320, wherein the new "past" period is processed in accordance with the processing discussed above.

If, in step 312, it is determined that the "current" period is not available to handle contacts of the "current" CT or, in step 314, it is determined that all "past" periods affecting the "current" period have been processed, then execution proceeds to step 324. In step 324 the staffing requirements for the "current" period are calculated. Preferably, the staffing requirements are calculated differently depending on whether a maximum occupancy goal is used. The maximum occupancy goal is a percentage that represents the desired maximum percent of time each period in which the agent is handling a contact or performing after contact handling work. Preferably, if a maximum occupancy goal is used, the following equation is used to calculate the staffing requirements:

$$\text{Staffing Requirements} = \left( \frac{ContactsHandled \times AHTinSeconds}{\frac{MaxOccGoalPct}{100} \times SecondsinStatPeriod} \right)$$

where:

"ContactsHandled" is equivalent to the "total contacts to handle this period" as calculated in step 320;

"AHTinSeconds" is the average handling time for the current CT;

"MaxOccGoalPct" is the maximum occupancy goal percentage (i.e., a MaxOccGoalPct goal value of 100 represents that the agent is continuously busy, moving from one contact to another with no administrative time spent between contacts); and "SecondsInStatPeriod" is the length in seconds of the current period.

Moreover, the staffing requirements are preferably determined according to the following equation when the staffing requirements are being calculated without a maximum occupancy goal:

$$\text{Staffing Requirements} = \left( \frac{ContactsHandled \times AHTinSeconds}{SecondsInStatPeriod} \right)$$

where:

"ContactsHandled" is equivalent to the "total contacts to handle this period" as calculated in step 320;

"AHTinSeconds" is the average handling time for the current CT; and

"SecondsInStatPeriod" is the length in seconds of the current period.

After calculating the requirements for the "current" period in step 324, execution proceeds to step 326, wherein a determination is made whether requirements have been calculated for all periods. If a determination is made that the requirements have not been calculated for all periods, then execution proceeds to step 328, wherein a new "current" period is selected. Thereafter, steps 310–328 are repeated for the newly selected "current" period.

If, in step 326, a determination is made that all staffing requirements for all periods have been calculated, then execution returns to step 222 (FIG. 2).

In an alternative embodiment, the forecasted contacts received includes backlog contacts, i.e., the current number of outstanding contacts to be handled. For example, if 205 emails, i.e., non-immediate CTs, are in the queue to be handled, then the backlog is equal to 205. If, however, in the next period, 10 emails were received, but 15 were handled, then the new backlog would be 205+10−15 or 200.

Furthermore, the backlog may allow some outstanding contacts to expire, such as when a contact has not been serviced within the service level goal. For example, if the total backlog is 205 emails, and the service level goal is to handle 100% of the emails within 4 hours, but of the total backlog, 55 have been in the queue for more than 4 hours, then the backlog expired is equal to 55.

Backlog could be used in forecasting by including the affects of the current and/or anticipated backlog, by examining the scheduled staffing hours and comparing to forecasted contacts to handle in the propagation of the contacts received. For example, the forecasting process could propagate the contacts received more to the end of the service time periods because of the backlog that has to be worked first.

It is understood that the present invention can take many forms and embodiments. Accordingly, several variations may be made in the foregoing without departing from the spirit or the scope of the invention.

Having thus described the present invention by reference to certain of its preferred embodiments, it is noted that the embodiments disclosed are illustrative rather than limiting in nature and that a wide range of variations, modifications, changes, and substitutions are contemplated in the foregoing disclosure and, in some instances, some features of the present invention may be employed without a corresponding use of the other features. Many such variations and modifications may be considered obvious and desirable by those skilled in the art based upon a review of the foregoing description of preferred embodiments. Accordingly, it is appropriate that the appended claims be construed broadly and in a manner consistent with the scope of the invention.

The invention claimed is:

1. A method, for use in a contact center environment expected to receive contacts that are not required to be serviced by contact center agents in real time, wherein the contact center environment has associated therewith a first forecast, the first forecast being a forecast of contact load expected to be received in each of a set of future time periods within a given future time range, comprising:
   (a) identifying a given service level goal for a given future time period within the given future time range of the first forecast, the service level goal describing a maximum amount of time that may occur between receipt of a given contact and handling of the given contact, wherein the given contact comprises a part of the contact load expected to occur during the given future time period;
   (b) for the given future time period of the first forecast, using the given service level goal identified for that given future time period to identify a number of time periods over which the contact load in that given future time period may be allocated;
   (c) for the given future time period of the first forecast, applying a given function to the contact load wherein, as a result, a percentage of the contact load for the given future time period is allocated into each time period of a given set of the identified number of time periods;
   (d) repeating steps (a)–(c) on an iterative basis for additional given future time periods within the given future time range to allocate the contact load for each additional given future time period; and
   (e) with respect to a given future time period, aggregating the contact load that has been allocated into that given future time period as a result of applying, on an iterative basis, steps (a)–(c) to generate a second forecast, the second forecast being a forecast of contact load expected to be handled in each of the set of future time periods within the given future time range, and wherein the second forecast differs from the first forecast in an amount of contact load in at least one future time period;
   wherein one or more of steps (a)–(c) are performed by one or more electronic processing devices;
   wherein the given function generates a product of a first value and a second value, wherein the first value is a product of the contact load for the given future time period and the given service level goal for the given future time period, and the second value is a quotient of a propagation value for a time period of the given set of the identified number of time periods divided by a sum of propagation values for the given set of the identified number of time periods.

2. The method as described in claim 1 wherein the given function is based on one or more factors selected from a set of factors including: a number of contact center agents expected to be available to service the contacts during the given set of identified number of time periods, an amount of time that a contact center agent may allocate to service contacts, an amount of excess capacity that a contact center agent has available, a backlog goal, an average handling time, and agent schedule adherence.

3. The method as described in claim 1 further including the step of:
   (f) using the second forecast to generate a staffing requirement for the given future time period.

4. The method as described in claim 1 further including the step of:
   (f) generating a staffing requirement for the given future time period as a function of the aggregate contact load that has been allocated into that given future time period.

5. The method as described in claim 1 further including the step of:
   (f) generating a staffing requirement for the given future time period as reflected in the second forecast as a function of the aggregate contact load that has been allocated into that given future time period and an agent average handling time that has been forecast for that given future time period.

6. The method as described in claim 1 wherein the contacts that are not required to be serviced by contact center agents in real time include contacts selected from a set of contacts that include: electronic communications and written communications.

7. The method as described in claim 6 wherein the electronic communications include at least one email.

8. The method as described in claim 6 wherein the electronic comniunications include at least one fax.

9. Apparatus, for use in a contact center environment expected to receive contacts that are not required to be serviced by contact center agents in real time, wherein the contact center environment has associated therewith a database that includes a first forecast, the first forecast being a forecast of contact load expected to be received in each of a set of future time periods within a given future time range, comprising:
   code executable on a processor to identify a given service level goal for a given future time period within the given future time range of the first forecast, the service level goal describing a maximum amount of time that may occur between receipt of a given contact and handling of the given contact, wherein the given contact comprises a part of the contact load expected to occur during the given future time period;

code executable on a processor that, for each given future time period of the first forecast, uses the given service level goal identified for that given future time period to identify a number of time periods over which the contact load in that given future time period may be allocated;

code executable on a processor that, for each given future time period of the first forecast, applies a given function to the contact load wherein, as a result, the contact load for the given future time period is allocated into each time period of a given set of the identified number of time periods; and code executable on a processor that, with respect to each given future time period, aggregates the contact load that has been allocated into that given future time period to generate a second forecast, the second forecast being a forecast of contact load expected to be handled in each of the set of future time periods within the given future time range, and wherein the second forecast differs from the first forecast in an amount of contact load in at least one future time period;

wherein the given function generates a product of a first value and a sceond value, wherein the first value is a product of the contact load for the given future time period and the given service level goal for the given future time period, and the second value is a quotient of a propagation value for a time period of the given set of the identified number of time periods divided by a sum of propagation values for the given set of the identified number of time periods.

10. The apparatus as described in claim 9 further including:

code executable on a processor that, with respect to each of one or more given. future time periods as reflected in the second forecast, generates a staffing requirement for that given future time period.

* * * * *